US010261368B2

(12) United States Patent
Peng et al.

(10) Patent No.: US 10,261,368 B2
(45) Date of Patent: Apr. 16, 2019

(54) PIXEL STRUCTURE

(71) Applicant: Shenzhen China Star Optoelectronics Technology Co., Ltd., Shenzhen (CN)

(72) Inventors: Bangyin Peng, Shenzhen (CN); Xiaohui Yao, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/897,701

(22) PCT Filed: Oct. 10, 2015

(86) PCT No.: PCT/CN2015/091622
§ 371 (c)(1),
(2) Date: Oct. 5, 2017

(87) PCT Pub. No.: WO2017/049670
PCT Pub. Date: Mar. 30, 2017

(65) Prior Publication Data
US 2018/0136505 A1    May 17, 2018

(30) Foreign Application Priority Data
Sep. 23, 2015  (CN) .......................... 2015 1 0608509

(51) Int. Cl.
G02F 1/1335    (2006.01)
G02F 1/1343    (2006.01)
G02F 1/1337    (2006.01)

(52) U.S. Cl.
CPC .... *G02F 1/13439* (2013.01); *G02F 1/134309* (2013.01); *G02F 1/133514* (2013.01);
(Continued)

(58) Field of Classification Search
CPC ........... G02F 1/13439; G02F 1/133514; G02F 1/134309; G02F 2001/133757; G02F 2201/123
(Continued)

(56) References Cited

U.S. PATENT DOCUMENTS 4,776,673 A    10/1988  Aoki et al.
6,411,346 B1    6/2002  Numano et al.
(Continued)

FOREIGN PATENT DOCUMENTS

CN    101114089 A    1/2008
CN    102236211 A    11/2011
(Continued)

OTHER PUBLICATIONS

Office Action dated Jun. 21, 2017 by the State Intellectual Property Office of the People's Republic of China in corresponding Chinese Patent Application No. 201510608509.9. (5 pages).
(Continued)

*Primary Examiner* — Charles S Chang

(57) ABSTRACT

A pixel structure is disclosed. The pixel structure includes first transparent conductive films that are arranged on color-resists of a color filter substrate, and second transparent conductive films that are arranged on sub pixel regions of an array substrate and correspond to the first transparent conductive films. The first transparent conductive films are connected with one another. An area of each first transparent conductive film is larger than an area of a corresponding second transparent conductive film. The first transparent conductive film is provided with a groove on a part thereof beyond the second transparent conductive film. According to the present disclosure, a light transmittance of the pixel structure can be greatly improved.

18 Claims, 3 Drawing Sheets

(52) U.S. Cl.
CPC ............ *G02F 2001/133757* (2013.01); *G02F 2201/123* (2013.01)

(58) Field of Classification Search
USPC .......................................................... 349/142
See application file for complete search history.

(56) References Cited

U.S. PATENT DOCUMENTS

| | | | | |
|---|---|---|---|---|
| 7,212,270 | B2* | 5/2007 | Takatori ............ | G02F 1/133707 349/144 |
| 8,259,269 | B2* | 9/2012 | Itou .................... | G02F 1/134363 349/128 |
| 8,964,158 | B2* | 2/2015 | Chen .................. | G02F 1/134309 349/129 |
| 2011/0261307 | A1* | 10/2011 | Shin .................. | G02F 1/133753 349/123 |
| 2016/0011464 | A1* | 1/2016 | Kim .................... | G02F 1/137 349/106 |

FOREIGN PATENT DOCUMENTS

| | | |
|---|---|---|
| CN | 103901663 A | 7/2014 |
| CN | 103901681 A | 7/2014 |
| JP | 2000-2889 A | 1/2000 |

OTHER PUBLICATIONS

Notification of Transmittal of the International Search Report and the Written Opinion of the International Searching Authority (Forms PCT/ISA/210, PCT/ISA/220, and PCT/ISA/237) dated Jun. 16, 2016, by the State Intellectual Property Office of People's Republic of China Patent Office in corresponding International Application No. PCT/CN2015/091622. (13 pages).

* cited by examiner

PIXEL STRUCTURE

CROSS REFERENCE TO RELATED APPLICATION

The present application claims priority of Chinese patent application CN201510608509.9, entitled "Pixel Structure" and filed on Sep. 23, 2015, the entirety of which is incorporated herein by reference.

FIELD OF THE INVENTION

The present disclosure relates to the technical field of liquid crystal display, and particularly to a pixel structure.

BACKGROUND OF THE INVENTION

According to Ultraviolet induced multi-domain Vertical Alignment (UV2A) technology, an inclining direction of liquid crystal molecules can be controlled with high accuracy along a direction of ultraviolet taking advantage of an alignment film which is made of a special polymer material. The basic principle of UV2A technology is stated as follows. A glass substrate is coated with a special alignment film which has a response to ultraviolet. When ultraviolet irradiates the alignment film, it will deflect along the irradiation direction, so that the liquid crystal molecules can be inclined along the irradiation direction of ultraviolet. The product which is produced through UV2A technology has a high aperture ratio, a high picture contrast, and a high response speed.

As shown in FIGS. 4 and 5, when a traditional pixel structure 100' is applied with UV2A technology, taking the alignment mode as shown in FIG. 4 as an example (as shown by the solid arrows in FIG. 4), black stripes 10' as shown in FIG. 5 would be generated. As shown in FIG. 5, due to the action of fringe electric field at edges of the pixel structure 100' (as shown by the solid arrows in FIG. 5), the liquid crystal molecules all incline from the edges of the pixel structure 100' to an inside part thereof (as shown by the dotted arrows in FIG. 5). When an angle between a direction of an action force of the fringe electric field and a rotation direction of the liquid crystal molecules is less than 90°, the edges of the pixel structure 100' will not be shaded by the liquid crystal molecules, and thus no black stripe 12' would be generated. When the angle between the direction of the action force of the fringe electric field and the rotation direction of the liquid crystal molecules is larger than 90°, the edges of the pixel structure 100' will be shaded by the liquid crystal molecules, and thus the black stripe 12' would be generated.

In general, in one pixel structure 100', the black stripes 10' comprise an orthogonal stripe 11' at a middle part thereof, and an edge black stripe 12' with a length being a half of a length of a corresponding edge of the pixel structure 100' at the edge thereof. With respect to the black stripes 10', the orthogonal stripe 11' exists inevitably due to the special orthogonal optical alignment mode of the UV2A technology and cannot be eliminated, but the edge black stripe 12' can be regulated through regulating the pixel structure 100'. If the edge black stripe 12' can be eliminated, a light transmittance of the pixel structure 100' can be greatly improved.

With respect to the aforesaid technical problem in the prior art, a pixel structure in which less black stripe would be generated at the edges thereof, and the light transmittance thereof can be improved is needed.

SUMMARY OF THE INVENTION

With respect to the technical defect in the prior art, the present disclosure provides a pixel structure.

According to the present disclosure, the pixel structure comprises first transparent conductive films that are arranged on color-resists of a color filter substrate, and second transparent conductive films that are arranged on sub pixel regions of an array substrate and correspond to the first transparent conductive films. The first transparent conductive films are connected with one another. An area of each first transparent conductive film is larger than an area of a corresponding second transparent conductive film. The first transparent conductive film is provided with a groove on a part thereof beyond the second transparent conductive film.

In the pixel structure according to the present disclosure, the area of each first transparent conductive film is larger than the area of a corresponding second transparent conductive film. When UV2A technology is used, an additional black stripe would be generated at the edge of the first transparent conductive film due to the fringe electric field effect thereof. In the pixel structure according to the present disclosure, the first transparent conductive film is provided with a groove on a part thereof beyond the second transparent conductive film. That is, the first transparent conductive film is provided with a groove on a part thereof where otherwise the additional black stripe would be generated. With this arrangement, the additional black stripe that is generated at the edge of the first transparent conductive film can be removed out of an opening area thereof, so that the black stripe does not appear at the edge of the first transparent conductive film any more, and a light transmittance of the pixel structure can be greatly improved.

According to some embodiments, the first transparent conductive film and the second transparent conductive film each have a rectangular shape. A projection of a central point of the first transparent conductive film coincides with a central point of the second transparent conductive film, so that the part of the first transparent conductive film beyond the second transparent conductive film forms an annular transparent conductive film. Since the projection of the central point of the first transparent conductive film coincides with the central point of the second transparent conductive film, a region of the first transparent conductive film corresponding to the second transparent conductive film can have a higher light transmittance. In addition, with the arrangement of the annular transparent conductive film, the black stripe that is generated at the edge of the first transparent conductive film can be regulated, and thus the light transmittance of the pixel structure can be regulated accordingly.

According to some embodiments, the annular transparent conductive film comprises a first rectangular part, a second rectangular part, a third rectangular part, and a fourth rectangular part that are connected with one another in sequence in counterclockwise direction. At least one of the first rectangular part, the second rectangular part, the third rectangular part, and the fourth rectangular part is provided with a groove. The groove is arranged on a part of the annular transparent conductive film where otherwise the black stripe would be generated, so that the generation of the black stripe on one rectangular part or a plurality of rectangular parts can be prevented, and the light transmittance of the pixel structure can be improved.

According to some embodiments, the first rectangular part, the second rectangular part, the third rectangular part, and the fourth rectangular part each are provided with a groove. The groove is arranged on each rectangular part at a position thereof where the black stripe would otherwise be generated. In this manner, the generation of the black stripe on the rectangular part can be prevented, and the light transmittance of the pixel structure can be improved.

According to some embodiments, the first rectangular part, the second rectangular part, the third rectangular part, and the fourth rectangular part each are provided with one groove.

According to some embodiments, the grooves arranged on the first rectangular part, the second rectangular part, the third rectangular part, and the fourth rectangular part do not interfere with one another. Since the black stripes that are generated at each rectangular part do not interfere with one another, the grooves are arranged in a same way. Therefore, the black stripe at the edge of the pixel structure can be eliminated.

According to some embodiments, a length of the groove is in a range from a half of a length of a corresponding edge of the second transparent conductive film to the length of the corresponding edge of the second transparent conductive film. With this arrangement, the groove can at least partly cover the black stripe generated at the annular transparent conductive film.

According to some embodiments, one end of the groove is aligned with one end of the corresponding edge of the second transparent conductive film, and the length of the groove is a half of the length of the corresponding edge of the second transparent conductive film. With this arrangement, the groove can totally cover the black stripe generated at the annular transparent conductive film.

According to some embodiments, a width of the groove is equal to a width of a corresponding annular transparent conductive film. With this arrangement, the manufacturing procedure of the groove can be simplified, and a calculation of a specific value of the width of the groove before the manufacturing thereof is not needed.

According to some embodiments, the first transparent conductive films are connected with one another through parts of the annular transparent conductive films where no groove is arranged. In this technical solution, the electrical connection of the pixel structure can be realized.

Compared with the prior art, in the pixel structure according to the present disclosure, the first transparent conductive film is provided with a groove on a part thereof beyond the second transparent conductive film. That is, the first transparent conductive film is provided with a groove on a part thereof where otherwise the additional black stripe would be generated. With this arrangement, the additional black stripe that is generated at the edge of the first transparent conductive film can be removed out of an opening area thereof, so that the black stripe does not appear at the edge of the first transparent conductive film any more, and a light transmittance of the pixel structure can be greatly improved. According to the present disclosure, the pixel structure can be provided with the groove based on the traditional pixel structure, so that a production efficiency of the pixel structure can be improved, and a production cost thereof can be reduced.

BRIEF DESCRIPTION OF THE DRAWINGS

The present disclosure will be illustrated in detail hereinafter with reference to the embodiments and the drawings. In the drawings.

Figure 1:
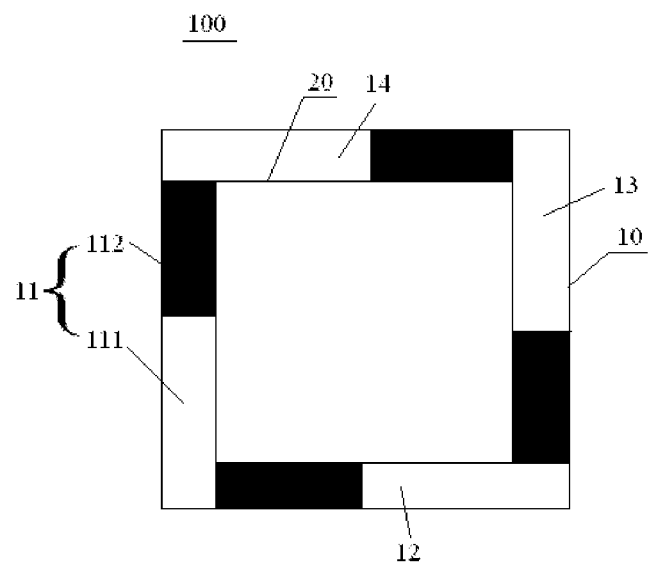
FIG. 1 is a top view of a pixel structure according to the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

The details described herein are only specific examples used for discussing the implementations of the present disclosure. The most useful and most understandable description on the principle and concept of the present disclosure is provided. The structural details which go beyond the scope of basic understanding of the present disclosure are not provided herein. Therefore, those skilled in the art can clearly understand, based on the description and the accompanying drawings, how to implement the present disclosure in different ways.

FIG. 1 is a top view of a pixel structure 100 according to the present disclosure. The pixel structure 100 comprises first transparent conductive films 10 that are arranged on each color-resist of a color filter substrate, and second transparent conductive films 20 that are arranged on a sub pixel region of an array substrate and correspond to the first transparent conductive films 10. The first transparent conductive films 10 are connected with one another. An area of each first transparent conductive film 10 is larger than an area of a corresponding second transparent conductive film 20. The first transparent conductive film 10 is provided with a groove on a part thereof beyond the second transparent conductive film 20. The groove is black part as shown in FIG. 1, and the specific structure thereof will be illustrated in detail below.

In the pixel structure 100 according to the present disclosure, the area of each first transparent conductive film 10 is larger than the area of a corresponding second transparent conductive film 10. When UV2A technology is used, an additional black stripe would be generated at the edge of the first transparent conductive film 10 due to the fringe electric field effect thereof. In the pixel structure 100 according to the present disclosure, the first transparent conductive film 10 is provided with a groove on a part thereof beyond the second transparent conductive film 20. That is, the first transparent conductive film 10 is provided with a groove on a part thereof where otherwise the additional black stripe would be generated. With this arrangement, the additional black stripe that is generated at the edge of the first transparent conductive film 10 can be removed out of an opening area thereof, so that the black stripe does not appear at the edge of the first transparent conductive film 10 any more, and a light transmittance of the pixel structure 100 can be greatly improved.

According to the embodiment as shown in FIG. 1, the first transparent conductive film 10 and the second transparent conductive film 20 each have a rectangular shape. A projection of a central point of the first transparent conductive film 10 coincides with a central point of the second transparent conductive film 20, so that a part of the first transparent conductive film 10 beyond the second transparent conductive film 20 forms an annular transparent conductive film. The annular transparent conductive film comprises a first rectangular part 11, a second rectangular part 12, a third rectangular part 13, and a fourth rectangular part 14 that are connected with one another in sequence in counterclockwise direction. Taking the first rectangular part 11 as an example, the first rectangular part 11 is provided with a groove 112.

Figure 2:
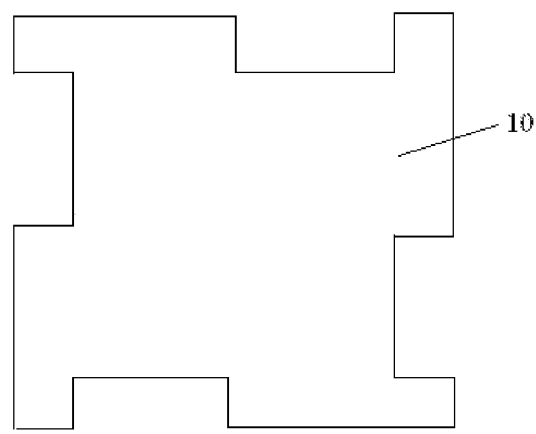
FIG. 2 schematically shows a first transparent conductive film in the pixel structure according to the present disclosure.

According to this technical solution, since the projection of the central point of the first transparent conductive film 10 coincides with the central point of the second transparent conductive film 20, a region of the first transparent conductive film 10 corresponding to the second transparent conductive film 20 can have a higher light transmittance. In addition, with the arrangement of the annular transparent conductive film, the black stripe that is generated at the edge of the first transparent conductive film 10 can be regulated, and thus the light transmittance of the pixel structure 100 can be regulated accordingly. Preferably, at least one of the first rectangular part, the second rectangular part, the third rectangular part, and the fourth rectangular part is provided with a groove 112 (only the groove 112 is indicated in FIG. 1). The groove 112 is arranged on a part of the annular transparent conductive film where otherwise the black stripe would be generated, so that the generation of the black stripe on one rectangular part or a plurality of rectangular parts can be prevented, and the light transmittance of the pixel structure 100 can be improved. Further preferably, the first rectangular part, the second rectangular part, the third rectangular part, and the fourth rectangular part each are provided with a groove 112, so that a structure of the first transparent conductive film 10 as shown in FIG. 2 can be formed. The groove 112 is arranged on each rectangular part at a position thereof where the black stripe would otherwise be generated. In this manner, the generation of the black stripe on the rectangular part can be prevented, and the light transmittance of the pixel structure 100 can be improved.

According to the embodiment as shown in FIG. 1, the first rectangular part, the second rectangular part, the third rectangular part, and the fourth rectangular part each are provided with one groove 112. Moreover, the grooves 112 arranged on the first rectangular part, the second rectangular part, the third rectangular part, and the fourth rectangular part do not interfere with one another. Since the black stripes that are generated at each rectangular part do not interfere with one another, the grooves 112 are arranged in a same way. Therefore, the black stripe at the edge of the pixel structure 100 can be eliminated.

In the pixel structure 100 according to the present disclosure, a length of the groove 112 is in a range from a half of a length of a corresponding edge of the second transparent conductive film 20 to the length of the corresponding edge of the second transparent conductive film 20. With this arrangement, the groove 112 can at least partly cover the black stripe generated at the annular transparent conductive film.

Preferably, one end of the groove 112 is aligned with one end of a corresponding edge of the second transparent conductive film 20, and the length of the groove 112 is a half of the length of the corresponding edge of the second transparent conductive film 20. With this arrangement, the groove 112 can totally cover the black stripe generated at the annular transparent conductive film.

According to the embodiment as shown in FIG. 1, a width of the groove 112 is equal to a width of a corresponding annular transparent conductive film. With this arrangement, the manufacturing procedure of the groove 112 can be simplified, and a calculation of a specific value of the width of the groove 112 before the manufacturing thereof is not needed.

Figure 3:
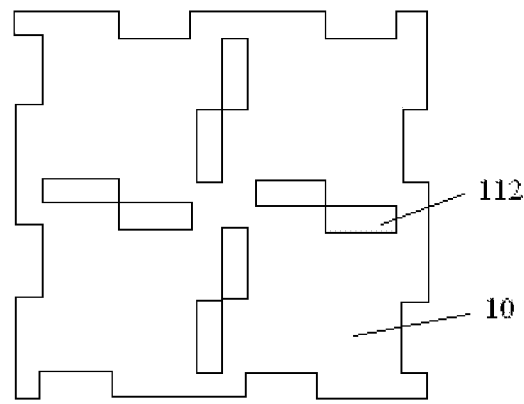
FIG. 3 schematically shows a connection mode of the plurality of first transparent conductive films according to the present disclosure.
Figure 4:
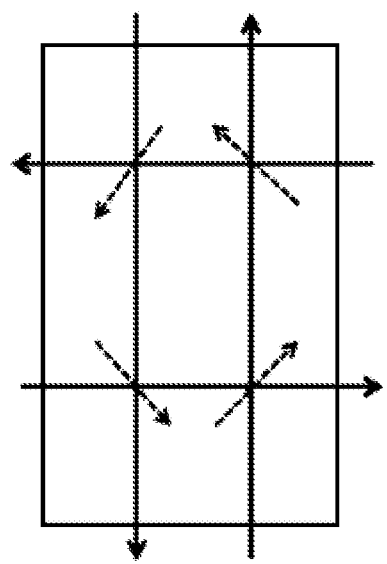
FIG. 4 schematically shows an alignment mode of a pixel structure in the prior art when UV2A technology is used.
Figure 5:
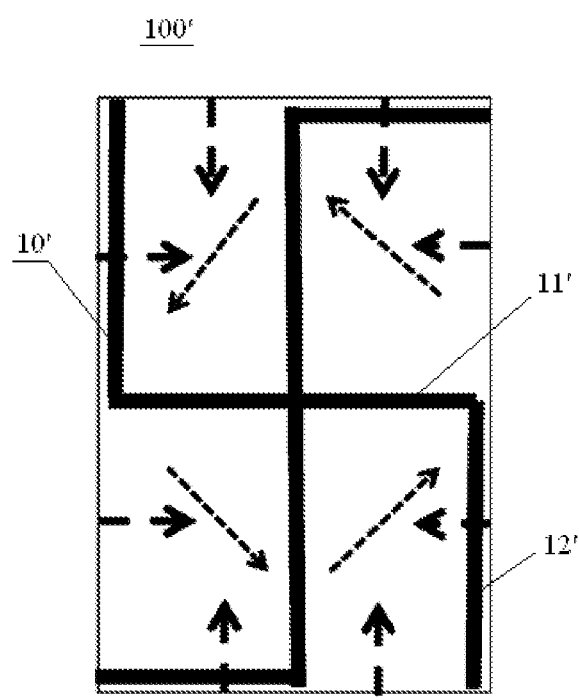
FIG. 5 schematically shows black stripes formed on the pixel structure in the prior art.

In addition, as shown in FIG. 3, the first transparent conductive films 10 are connected with one another through a part of the annular transparent conductive film where no groove is arranged. In this technical solution, the electrical connection of the pixel structure 100 can be realized.

Compared with the prior art, in the pixel structure 100 according to the present disclosure, the first transparent conductive film 10 is provided with a groove 112 on a part thereof beyond the second transparent conductive film 20. That is, the first transparent conductive film 10 is provided with a groove 112 on a part thereof where otherwise the additional black stripe would be generated. With this arrangement, the additional black stripe that is generated at the edge of the first transparent conductive film 10 can be removed out of an opening area thereof, so that the black stripe does not appear at the edge of the first transparent conductive film 10 any more, and a light transmittance of the pixel structure 100 can be greatly improved. It is shown by simulation of software that, the light transmittance of the pixel structure 100 according to the present disclosure can be improved by 2.93% compared with the traditional pixel structure in which no groove is arranged. In addition, according to the present disclosure, the pixel structure 100 can be provided with the groove based on the traditional pixel structure, so that a production efficiency of the pixel structure 100 can be improved, and a production cost thereof can be reduced.

It should be noted that, the above embodiments are described only for better understanding, rather than restricting the present disclosure. Those skilled in the art can make amendments to the present disclosure within the scope as defined in the claims and without departing from the spirit and scope of the present disclosure. The present disclosure is described according to specific methods, materials, and implementations, but the present disclosure is not restricted by the details disclosed herein. On the contrary, the present disclosure is applicable for the equivalent structures, methods, and applications with the same functions as those defined in the claims.

The invention claimed is:

1. A pixel structure, comprising:
    first transparent conductive films that are arranged on color-resists of a color filter substrate; and
    second transparent conductive films that are arranged on sub pixel regions of an array substrate and correspond to the first transparent conductive films,
    wherein the first transparent conductive films are connected with one another;
    wherein an area of each first transparent conductive film is larger than an area of a corresponding second transparent conductive film;
    wherein the first transparent conductive film is provided with a groove on a part thereof beyond the second transparent conductive film;
    wherein the first transparent conductive film and the second transparent conductive film each have a rectangular shape; and
    wherein a projection of a central point of the first transparent conductive film coincides with a central point of the second transparent conductive film, so that the part of the first transparent conductive film beyond the second transparent conductive film forms an annular transparent conductive film.

2. The pixel structure according to claim 1,
wherein the annular transparent conductive film comprises a first rectangular part, a second rectangular part, a third rectangular part, and a fourth rectangular part that are connected with one another in sequence in counterclockwise direction; and
wherein at least one of the first rectangular part, the second rectangular part, the third rectangular part, and the fourth rectangular part is provided with a groove.

3. The pixel structure according to claim 2, wherein the first rectangular part, the second rectangular part, the third rectangular part, and the fourth rectangular part each are provided with a groove.

4. The pixel structure according to claim 3, wherein the first rectangular part, the second rectangular part, the third rectangular part, and the fourth rectangular part each are provided with one groove.

5. The pixel structure according to claim 4, wherein the grooves arranged on the first rectangular part, the second rectangular part, the third rectangular part, and the fourth rectangular part do not interfere with one another.

6. The pixel structure according to claim 2, wherein a length of the groove is in a range from a half of a length of a corresponding edge of the second transparent conductive film to the length of the corresponding edge of the second transparent conductive film.

7. The pixel structure according to claim 6,
wherein one end of the groove is aligned with one end of the corresponding edge of the second transparent conductive film; and
wherein the length of the groove is a half of the length of the corresponding edge of the second transparent conductive film.

8. The pixel structure according to claim 2, wherein the first transparent conductive films are connected with one another through parts of the annular transparent conductive films where no groove is arranged.

9. The pixel structure according to claim 3, wherein a length of the groove is in a range from a half of a length of a corresponding edge of the second transparent conductive film to the length of the corresponding edge of the second transparent conductive film.

10. The pixel structure according to claim 3, wherein the first transparent conductive films are connected with one another through parts of the annular transparent conductive films where no groove is arranged.

11. The pixel structure according to claim 4, wherein a length of the groove is in a range from a half of a length of a corresponding edge of the second transparent conductive film to the length of the corresponding edge of the second transparent conductive film.

12. The pixel structure according to claim 4, wherein the first transparent conductive films are connected with one another through parts of the annular transparent conductive films where no groove is arranged.

13. The pixel structure according to claim 5, wherein a length of the groove is in a range from a half of a length of a corresponding edge of the second transparent conductive film to the length of the corresponding edge of the second transparent conductive film.

14. The pixel structure according to claim 5, wherein the first transparent conductive films are connected with one another through parts of the annular transparent conductive films where no groove is arranged.

15. The pixel structure according to claim 1, wherein a length of the groove is in a range from a half of a length of a corresponding edge of the second transparent conductive film to the length of the corresponding edge of the second transparent conductive film.

16. The pixel structure according to claim 15,
wherein one end of the groove is aligned with one end of the corresponding edge of the second transparent conductive film; and
wherein the length of the groove is a half of the length of the corresponding edge of the second transparent conductive film.

17. The pixel structure according to claim 1, wherein a width of the groove is equal to a width of a corresponding annular transparent conductive film.

18. The pixel structure according to claim 1, wherein the first transparent conductive films are connected with one another through parts of the annular transparent conductive films where no groove is arranged.

* * * * *